United States Patent [19]

Balasubramanyan et al.

[11] 3,881,010

[45] Apr. 29, 1975

[54] ANTI-BACTERIAL PROCESS USING SUBSTITUTED THIADIAZOLES

[75] Inventors: Sugavanam Balasubramanyan; Roland Thomas Victor Fox, both of Wokingham, England

[73] Assignee: Imperial Chemical Industries Limited, London, England

[22] Filed: May 23, 1973

[21] Appl. No.: 363,157

[30] Foreign Application Priority Data

June 8, 1972 United Kingdom............... 26809/72

[52] U.S. Cl. .............................................. 424/270
[51] Int. Cl. .......................... A01n 9/12; A01n 9/22
[58] Field of Search.............. 424/270; 260/306.8 D

[56] References Cited
UNITED STATES PATENTS
2,943,980   7/1960   Maffii et al. ........................ 424/270

FOREIGN PATENTS OR APPLICATIONS
1,067,440   10/1959   Germany

OTHER PUBLICATIONS
Hoggarth, Journal of the Chemical Society, 1949, pp. 1163–1167.

Primary Examiner—Jerome D. Goldberg
Assistant Examiner—Allen J. Robinson
Attorney, Agent, or Firm—Cushman, Darby & Cushman

[57] ABSTRACT

A method of combating bacterial diseases of plants which comprises applying to the plants, or to seeds, or to a medium in which plants are growing or to be grown, a compound of the formula:

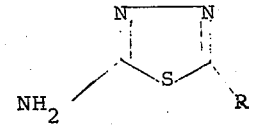

wherein R is phenyl, optionally substituted with one or more halogen atoms, or alkyl, alkoxy, nitro, or amino groups; or a phytologically acceptable acid addition salt thereof.

2 Claims, No Drawings

ANTI-BACTERIAL PROCESS USING SUBSTITUTED THIADIAZOLES

This invention relates to methods of combating bacterial and fungal diseases of plants.

According to the present invention, there is provided a method of combating bacterial diseases of plants, which comprises applying to the plants, or to seeds thereof, or to a medium in which the plants are growing or are to be grown, a compound of formula:

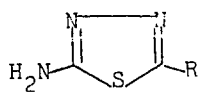

wherein R is a phenyl group optionally substituted by one or more halogen atoms or alkyl, alkoxy, nitro or amino groups; or a phytologically acceptable acid addition salt thereof. Thus R may be, conveniently, a para-methoxy phenyl group or a para nitro phenyl group.

When the phenyl group is substituted with one or more halogen atoms these may be chlorine, fluorine, bromine or iodine atoms. Suitable alkyl groups include methyl, ethyl, propyl, butyl, amyl and hexyl groups and the alkoxy groups may likewise contain from 1 to 6 carbon atoms.

Specific compounds which may be used in the invention process are set out in Table 1 below. These correspond to the general formula:

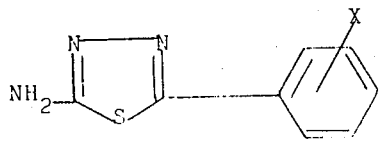

where X represents hydrogen or one or more substituent groups as specified.

Table 1

| Compound No. | X |
| --- | --- |
| 1 | 4 — nitro. |
| 2 | 4 — chloro. |
| 3 | 2 — Chloro. |
| 4 | 2,4 — dichloro. |
| 5 | 3,4 — dichloro. |
| 6 | 4 — amino |
| 7 | 4 — methoxy |
| 8 | H. |
| 9 | 2,6 — dichloro. |
| 10 | 4 — bromo. |
| 11 | 2 — iodo-5-bromo. |
| 12 | 2 — iodo-3,5-dibromo. |
| 13 | 3 — bromo-4-fluoro. |
| 14 | 4 — fluoro. |
| 15 | 2 — nitro. |
| 16 | 3 — nitro. |
| 17 | 2 — methyl. |
| 18 | 3 — methyl. |
| 19 | 4 — methyl. |
| 20 | 2 — methoxy. |
| 21 | 3,4-dimethoxy. |
| 22 | 3,4,5-trimethoxy. |

The invention embraces the use as plant antibacterial agents of acid addition salts of compounds defined hereinabove and prepared simply by treatment of the compound with an organic acid such as acetic, propionic, glycolic, lactic, pyruvic, oxalic, malonic, succinic, maleic, fumaric, malic, tartaric, citric, benzoic, cinnamic, mandelic, methanesulfonic, p-toluenesulfonic, salicyclic, p-aminosalicylic, 2-phenoxybenzoic or 2-acetoxybenzoic acid or by treatment of the compound with an inorganic acid such as a hydrochloric, hydrobromic, hydroiodic, sulphuric, nitric, thiocyanic, or phosphoric acid.

The process of this invention may be modified if desired by applying the active agent or a salt thereof, in admixture with other antibacterial agents, for example streptomycin.

The compounds useful in the invention process can be prepared by any of the methods well known in the art for making 1,3,4-thiadiazole derivatives.

Thus thiosemicarbazide

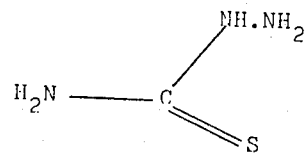

may be acylated in the 1-position, with a carboxylic acid, or a reactive derivative thereof and ring closure then effected, for example with an acid, or with acetyl chloride, with the elimination of water, for example as represented by the following diagram.

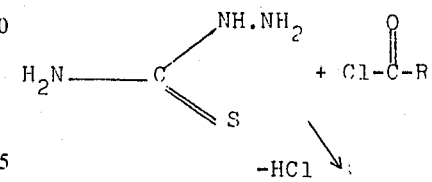

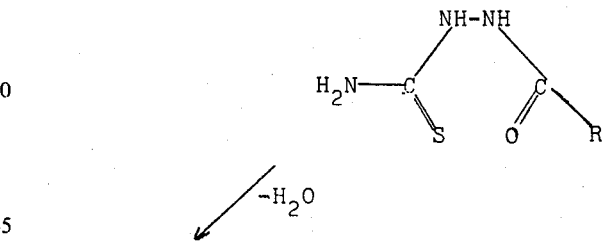

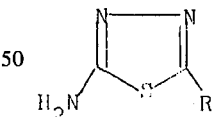

Alternatively thiosemicarbazide may be reacted with a substituted iminoether (German Pat. No. 1067440:) as represented by the diagram:

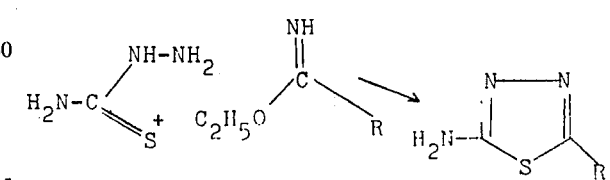

Further processes for preparing the invention compounds are set out in the Journal of the Chemical Society 1949 pp 1163-1167 (E. Hoggarth) "Compounds Related to Thiosemicarbazide"Part II. In the experimental data on page 1165 and 1166 there is a specific description Part methods for the preparation of the specific compounds set out in Table 1 hereinafter.

The bacterial diseases which can be combatted in vivo by the invention process include diseases arising from the following specific organisms:

Xanthomonas oryzae (blight of rice)
Corynebacterium michiganense, (canker of tomatoes)
Xanthomonas malvacearum (blackarm of cotton)
Erwinia amylovora (fire blight of pears and apples)
Pseudomonas phaseolicola (halo blight of beans)
Pseudomonas lachrymans (angular leaf spot of cucumber)

A particularly useful feature of the activity of the plant anti-bacterial agents is their ability to act as systemic bactericides, that is to say, their ability to move in a plant to combat an infection or infestation thereon remote from a site of initial application of an agent. Thus an agent or a composition containing the same, may be applied to the soil surrounding the roots of a plant and be taken up by the plant through its roots to combat bacterial pests on the plant.

In use the plant antibacterial agents may be applied as such or as simple solutions, e.g. of their salts. Preferably however, they are formulated into compositions using for example, an adjuvant such as an inert diluent or carrier, which may be a solid or a liquid.

In a further aspect, therefore, this invention provides a plant anti-bacterial composition comprising, as an active ingredient or agent, a compound as defined hereinabove or a salt thereof, if desired in the presence of a carrier.

In a preferred aspect the invention provides a plant antibacterial composition comprising, as an active agent, an organic acid addition salt of a compound as defined hereinabove, or an inorganic acid addition salt thereof.

The active agents, and compositions containing them can be used to combat plant bacteria in a number of ways. Thus they can be applied to the foliage of an infected plant, to seed or other propagative parts of plants, or to the soil or other medium in which plants are growing or to be planted. All these modes of application are deemed to fall within the scope of the expression "applying to the locus of a plant" used hereinafter. The particular type of composition used in any instance will depend upon the particular purpose for which it is to be used.

The invention compositions may be in the form of dusting powders or granules wherein the active ingredient is mixed with a solid diluent or carrier. Suitable solid diluents or carriers may be, for example, kaolinite (china clay) montmorillonite, attapulgite, talc, pumice, silica, calcium carbonate, gypsum, powdered magnesia, Fuller's earth, Hewitt's earth and diatomaceous earth. Compositions for dressing seed, for example, may comprise an agent assisting the adhesion of the composition to the seed, for example, a mineral oil.

The compositions may also be in the form of dispersible powders or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispersing agents and emulsifying agents may be of the cationic, anionic, or non-ionic type. Suitable agents of the cationic type include, for example, quaternary ammonium compounds, for example, cetyltrimethylammonium bromide. Suitable agents of the anionic type include, for example, soaps, salts of aliphatic monoesters of sulphuric acid, for example sodium lauryl sulphate, salts of sulphonated aromatic compounds, for example sodium dodecylbenzenesulphonate, sodium, calcium or ammonium lignosulphonate, butyl-naphthalene sulphonate, and a mixture of the sodium salts of diisopropyl and triisopropyl naphthalene sulphonic acids.

Suitable agents of the non-ionic type include, for example, the condensation products of ethylene oxide with fatty alcohols such as oleyl alcohol or cetyl alcohol, or with alkyl phenols such as octylphenol, nonylcresol etc., Other non-ionic agents are the partial esters derived from long chain fatty acids and hexitol anhydrides, the condensation products of the said partial esters with ethylene oxide, the lecithins, and block copolymers of ethylene oxide and propylene oxide.

Suitable suspending agents are, for example, bentonite, pyrogenic silica, and hydorphilic colloids, for example polyvinylpyrrolidone and sodium carboxymethylcellulose, and the vegetable gums, for example gum acacia and gum tragacanth.

The aqueous solutions dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The active ingredients may also be formulated into compositions comprising capsules or microcapsules containing either the active ingredient itself, or a composition containing the active ingredient, and prepared by any of the known encapsulation or microencapsulation techniques.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example, for improving the distribution, adhesive powder and resistance to rain on treated surfaces, the different compositions can be better adapted for the various uses for which they are intended. The active ingredients of this invention as hereinbefore defined may also be conveniently formulated by admixing them with fertilizers. A preferred composition of this type comprises granules of fertilizer material incorporating, for example, coated with, an active ingredient. The fertilizer material may, for example, comprise nitrogen or phosphate-containing substances.

In yet a further aspect of the invention, therefore, we provide a fertilizer comprising an active ingredient as hereinbefore defined.

The compositions which are to be used in the form of aqueous dispersions or emulsions are generally supplied in the form of a concentrate containing a high proportion of the active ingredient or ingredients, the said concentrate to be diluted with water before use.

These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85% by weight of the active ingredient or ingredients and generally from 25–60% by weight of the active ingredient or ingredients. When diluted to form aqueous preparations, such preparations may contain varying amounts of the active ingredients or ingredients depending upon the purpose for which they are to be used, but an aqueous preparation containing between 0.01 and 10% by weight of active ingredient or ingredients may be used.

It is to be understood that the anti-bacterial compositions of this invention may comprise, in addition to an active ingredient as hereinbefore defined, one or more other compounds having similar, or any other biological activity. Thus the agents used may include a benzimidazole or streptomycin; or a compound acting in synergistic conjunction with the agent.

The application of the anti-bacterial compounds according to the process of the invention may be carried out in a variety of ways depending inter alia upon the identity of the disease to be combatted, and the situation in which it is encountered. For example, plants infected with disease or liable to infection may be sprayed with or dipped into compositions containing an active compound. Woody and herbaceous plants may, for example, be painted with such a composition or treated with a grease formulation containing the active agent. Such paint and grease formulations may be particularly useful for application to cut wounds and galls on plants. Plant seeds may be soaked in aqueous compositions containing an active agent or treated with seed dressings comprising a dispersion of the active agent, in a solid diluent, for example kaolin.

The following Examples illustrate the antibacterial processes of this invention and compositions therefor. In these Examples the streptomycin used was in the form of a commercial formulation sold under the name of "Agrimycin". Agrimycin contains 15% of streptomycin and 1.5% of oxytetracycline. This material is presently used commercially for the control of bacterial diseases of plants.

EXAMPLE 1

This example illustrates the control of various plant bacterial diseases according to the invention processes. The procedure for each disease is described below and thereafter, in Table 2, are set out the results. The actual compounds used are set out and numbered in Table 1 above.

Test Procedure for *Erwinia amylovora* (fireblight of pears).

Pear seedlings grown in 2 inch pots were treated with a root drench (10 ml.) containing the chemical compound under test. A further group of seedlings was treated with a root drench (10 ml) containing streptomycin (1000 parts per million). Twenty four hours later, both groups of plants were inoculated with *Erwinia amylovora* by applying a suspension of cells of this bacterium to wounds made in the seedling. After two weeks the condition of the pear seedlings was assessed on a 0–4 scale, where 0 is no control, 1 is slight control, 2 is fair control, 3 is good control and 4 is complete control. The mean results are recorded in Table 2.

Test Procedure for *Corynebacterium michiganese* (tomato canker).

Tomato seedlings grown in 2 inch pots were treated with a root drench (10 ml.) containing the chemical compound under test. A further group of seedlings was treated with a root drench (10 ml.) containing streptomycin (1000 ppm). Twenty four hours later the seedlings were inoculated with *Corynebacterium michiganese* by applying a suspension of cells of this bacterium to wounds made in the seedlings.

After three weeks the condition of the tomato seedlings was assessed on a 0–4 scale; where 0 is no control, 1 is slight control, 2 is fair control, 3 is good control, and 4 is complete control. Phytotoxicity was assessed but none of the compounds exhibited phytotoxic effects at 1000 and 100 ppm.

Test Procedure for *Pseudomonas phaseolicola*

Cotton seeds were soaked for 24 hours in a $10^{10}$ cells per millilitre suspension of 18 hour old bacteria and then dried. The seeds were then dressed with a formulation containing the compounds of Table 1 under test dispersed in Kaolin containing 2% mineral oil. The concentration of the active compound was 12½% by weight and the seed dressing was applied at the rate of 1000 parts of active compound per million parts of seeds. Five seeds were then planted per pot in 2 inch diameter pots, replicated 4 times. Emergency of the seedlings and disease control was assessed fourteen days later keeping the plants in a relative humidity of 100%. The control of disease obtained is expressed as a grading on a grading scale of from 0 to 4 where, as before, 0 represents non-germinated seeds and wholly infected seedlings and 4 represents germinated seeds and completely disease free seedlings.

Test Procedure for *Pseudomonas phaseolicola*

Dwarf French Bean seed were infected with *Pseudomonas phaseolicola* (haloblight of beans) by soaking for 6 hours in an 18 hour old nutrient broth shake culture of *Pseudomonas phaseolicola*. The seeds were then air dried to constant weight at 25°C. The seeds were then dressed with a seed dressing containing 1000 parts of the compound under test.per million parts of seed. The seeds were then planted in sterile compost. After 2 weeks the condition of the emerged seedlings was assessed and, as before, the degree of control is expressed in Table 2 on a scale of 0 to 4, as above.

Test procedure for *Pseudomonas lachrymans*.

Cucumber seedlings, 1 week old were treated with the test compounds by the application of a 10 ml root drench containing 100 parts per million of the compounds under test. 24 Hours later, the plants were exposed to infection by applying one drop of an inoculum of *Pseudomonas lachrymans* to the bud. The seedlings were kept at 100% relative humidity in a glass house maintained at a temperature of 20–30°C and then assessed on a 0–4 scale (as above) 7 days later.

Test procedure for *Xanthomonas oryzae* (bacterial blight of rice).

Rice seedlings at the three leaf stage were root drenched (10 ml.) and sprayed with the chemical compound under test. Twenty-four hours later the plants were inoculated by wounding with forceps dipped in a suspension of *Xanthomonas oryzae*. After 14 days at 100% relative humidity the seedlings were assessed for disease on a 0–4 scale, where the gradings 0, 1, 2, 3 and 4 represent the same degree of control as previously described for the diseases above. Results are expressed in Table 2.

the standard 100 ppm Streptomycin and 5000 ppm cuprous oxide sprays were applied in a similar way. All treatments were formulated with 200 ppm Agral 90 wetter. "Agral"90 is a surface active agent and comprises a mixture of "Lissapol" NX (90%) and ethyl alcohol (10%). Lissapol NX is a condensate of 1 mole of nonyl phenol with 8 moles of ethylene oxide. Agral and Lissapol are Trade Marks. The pear leaves were assessed for symptoms of fireblight at three periods one week apart. The results are given in the Table below. A similar test was carried out on flowering "Golden Delicious" apple trees but only one assessment was made. In practice many strains of *Erwinia amylovora* are resistant to streptomycin and copper sprays are phytotoxic at effective rates.

TABLE 2

In the table below "—" means not tested at the rate shown

| Compound No. Table 1 | Rate ppm | Antibacterial Activity | | | | | |
|---|---|---|---|---|---|---|---|
| | | Fireblight (*Erwinia amylovora*) | Tomato canker (*Corynebacterium michiganense*) | Cotton black arm (*Xanthomonas malvacearum*) | Haloblight of bean (*Pseudomonas phaseolicola*) | Angular leaf spot of cucumber (*Pseudomonas Lachrymans*) | Bacterial Blight of Rice (*Xanthomonas oryzae*) |
| 1 | 1000 | 3 | — | 2 | 4 | — | — |
|   | 100  | 4 | 2 | — | — | 2 | 2 |
| 3 | 1000 | 0 | — | — | — | — | 0 |
|   | 100  | 0 | — | — | — | — | 1 |
| 4 | 1000 | — | — | 0 | 3 | — | — |
|   | 100  | 2 | 0 | — | — | — | 0 |
| 5 | 1000 | — | — | 2 | 1 | — | — |
|   | 100  | 0 | 1 | — | 0 | — | 1 |
| 6 | 1000 | 2 | — | — | — | — | 0 |
|   | 100  | 1 | — | — | — | — | 0 |
| 7 | 1000 | 2 | 1 | 1 | 4 | — | — |
|   | 100  | 4 | 3 | — | — | 1 | 1 |
| 8 | 1000 | — | — | 0 | 1 | — | — |
|   | 100  | 3 | 3 | — | 4 | 0 | 1 |
| Streptomycin ("Agrimycin") | 1000 | 1 | 0 | 0 | 0 | 0 | — |
|   | 100 | 1 | 1 | 0 | 0 | 0 | 0 |
| Untreated Control | | 0 | 0 | 0 | 0 | 0 | 0 |

In addition to the glasshouse tests described, field trials were carried out with compounds Nos. 1 and 7 in Table 1 as these had given the best control of the diseases in the glasshouse.

Test procedures and results against *Erwinia amylovora* (Fireblight) in field trials.

In the first test in N. C., U.S.A., 4 replicates of 5 non-flowering pear saplings artificially inoculated by spraying with a non-streptomycin resistant stain of *Erwinia amylovora* were sprayed at 7 day intervals starting at foliage bud break with the test chemicals. In addition

| Compound | Rate of Application (ppm) | Pear Trees Percentage control of Fireblight | | | Apple Trees |
|---|---|---|---|---|---|
| | | Assessment after | | | Assessment after one week |
| | | 1 Week | 2 Weeks | 3 Weeks | |
| No. 1 of Table 1 | 200  | 78 | 21 | 0  | 0  |
| No. 1 of Table 1 | 1000 | 83 | 86 | 96 | 43 |
| No. 7 of Table 1 | 200  | 59 | 9  | 18 | 13 |
| Streptomycin    | 100  | 85 | 87 | 96 | 39 |
| Cuprous oxide   | 5000 | 84 | 77 | 90 | 0  |
| Control Untreated | — | 0 | 0 | 0 | 0 | p.p.m. = parts per million.

Test procedures and results against *Xanthomones malvacerum* (blackarm of cotton) in field trials.

In this test 4 replicates of 100 cotton seeds artificially inoculated by soaking in *Xanthomonas malvacearum* were dressed with a formulation containing 25% of compound No. 1 of Table 1. A similar batch was dressed with a standard cuprous oxide formulation. The seeds were planted in a field in N. Carolina, U.S.A., the percentage of seedlings with blackarm symptoms were assessed after emergence. The results are given in the table below.

| Compound | Rate of Application in ppm (seed Dressing) | Percentage No. of Seedlings displaying Disease symptoms |
| --- | --- | --- |
| No.1 of Table 1 | 1000 | 57 |
| Cuprous oxide | 5000 | 48 |
| Untreated Control | — | 70 |

Compound No. 1 of Table 1 displayed activity comparable with cuprous oxide at one fifth of the application rate.

Test procedures and results against *Pseudomonas phaseolicola* (Haloblight of beans) in field trials In this test carried out in Berkshire, England, 4 replicates of 100 Dwarf French Beans ('Canadian Wonder') were 50% artificially infected with *Pseudomonas phaseolicola*. The seedlings were sprayed at fortnightly intervals after they had emerged with 25% a.i. dispersible powder formulations made up in water. The percentage of the plants with secondary spot symptoms was assessed 8 weeks after planting, and the percentage of infected pods were assessed 14 weeks after planting. The results show that compounds Nos. 1 and 7 are more effective for the control of haloblight of beans than cuprous oxide sprays, even at high rates. The results are given in tabular form below.

| Compound | Rate of Application in p.p.m. | Percentage No. of plants displaying secondary disease symptoms | Percentage No. of Infected Pods |
| --- | --- | --- | --- |
| No. 1 of Table 1 | 1000 | 0.0 | 2.33 |
| No. 7 of Table 1 | 1000 | 1.9 | 0.33 |
| Cuprous Oxide | 3000 | 0.5 | 7.00 |
| Untreated Control | — | 3.5 | 13.67 |

Test Procedures and results against *Pseudomonas morsprunorum* (cherry canker)

In this test 10 replicated sapling cherry trees (variety East Malling F121 rootstocks) naturally infected with *Pseudonomas mors prumorum* were sprayed at fortnightly intervals with test chemical. The assessment was made by counting the number of leaves with symptoms among the top 4 leaves per tree and the results are expressed as a percentage of the control of the disease level in the table below.

| Compound | Rate of Spray Application in p.p.m. | Percentage Control of cherry tree canker disease |
| --- | --- | --- |
| No.1 of Table 1 | 1000 | 60 |
| No.7 of Table 1 | 1000 | 65 |
| Cuprous Oxide | 5000 | 0 |
| Control Untreated | — | 0 |

It is clear that both compounds 1 and 7 have given superior control of cherry canker disease than that given by cuprous oxide.

The above results illustrate with considerable clarity the advantages of the plant antibacterial agents, defined as hereinbefore set forth, over both streptomycin (Agrimycin) and cuprous oxide, which are presently the well known commercially available substances for combating plant bacterial diseases.

EXAMPLE 2

This example illustrates a dusting powder which may be applied directly to plants or other surfaces and comprises 1% by weight of compound No. 1 of Table 1 and 99% by weight of talc.

EXAMPLE 3

5 Parts by weight of Compound No. 7 of Table 1 were thoroughly mixed in a suitable mixer with 95 parts by weight of talc. There was thus obtained a dusting powder.

EXAMPLE 4

The ingredients listed below were ground together in the proportions stated to produce a powdered mixture readily dispersible in liquids.

| | % wt. |
| --- | --- |
| Compound No.1 of Table 1 | 50% |
| Dispersol T ("Dispersol" is a Trade Mark) a mixture of sodium sulphate and a condensate of formaldehyde with the sodium salt of naphthalene sulphonic acid) | 5% |
| China clay | 45% |
| | 100% |

EXAMPLE 5

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44–100 to obtain the desired size of grains.

| | % wt. |
| --- | --- |
| Compound No.7 of Table 1 | 50% |
| Dispersol T | 12.5% |
| Calcium lignosulphonate | 5% |
| Sodium dodecylbenzenesulphonate | 12.5% |
| Sodium acetate | 20% |
| | 100% |

EXAMPLE 6

A composition suitable for use as a seed dressing was prepared by mixing all three of the ingredients set out below in the proportions stated.

|  | % wt. |
| --- | --- |
| Compound No.7 of Table 1 | 80% |
| Mineral Oil | 2% |
| China Clay | 18% |
|  | 100% |

EXAMPLE 7

A granular composition was prepared by dissolving the active ingredient in a solvent, spraying the solution obtained onto the granules of pumice and allowing the solvent to evaporate.

|  | % wt. |
| --- | --- |
| Compound No.1 of Table 1 | 5% |
| Pumice Granules | 95% |
|  | 100% |

EXAMPLE 8

An aqueous dispersion formulation was prepared by mixing and grinding the ingredients recited below in the proportions stated.

|  | % wt. |
| --- | --- |
| Compound No.7 of Table 1 | 40% |
| Calcium lignosulphonate | 10% |
| Water | 50% |
|  | 100% |

EXAMPLE 9

The following example illustrates the preparation of 2-amino-5-p-nitrophenyl-1,3,4-thiadiazole (Compound No. 1 of Table 1). 1-p-nitrobenzoylthiosemicarbazide (240 parts) is slowly added during 1 hour to 90% V/V Sulphuric acid (1.1 l) with stirring keeping the temperature at 120°C. After the addition the solution is stirred for 1 hour at 120°C, cooled and poured onto ice (3000 parts). The slurry is basified with ammonia keeping the temperature below 30°C. The bright yellow solid is filtered off, washed with water and dried. It is then recrystallized from ethoxyethanol to yield a solid melting at 254°C.

The 1-p-nitrobenzoylthiosemicarbazide used in the above process was prepared as follows:

Thiosemicarbazide (273 parts) suspended in dry pyridine (3 l) is cooled to -5°C and treated with p-nitrobenzoyl chloride (556.5 parts) during 1 hour keeping the temperature below 0°C. The reaction mixture is stirred for 12 hours, during which time room temperature was attained, and then poured into hot water (6 l). The mixture is heated on a steam bath, filtered and the filtrate cooled in an ice bath. The solid is filtered and dried and recrystallized from n-propyl alcohol, to yield a solid melting at 219°C with decomposition.

Analogous processes were used to prepared the compounds specified in Table 1 above.

We claim:

1. A method of combating bacteria which causes diseases of plants which comprises applying to said bacteria an anti-bacterially effective amount of a compound of the formula:

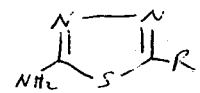

wherein R is phenyl or phenyl substituted with halogen, alkyl of 1–6 carbons, alkoxy of 1–6 carbons, nitro, or amino; or a phytologically acceptable acid addition salt thereof.

2. The method of claim 1 wherein said compound is 2-amino-5-p-nitrophenyl-1,3,4-thiadiazole or 2-amino-5-p-methoxyphenyl-1,3,4-thiadiazole.

* * * * *